United States Patent [19]

Dergo

[11] 4,449,867
[45] May 22, 1984

[54] DOWEL DRILL FIXTURE

[76] Inventor: Stephen J. Dergo, 7821 Timor St., Long Beach, Calif. 90808

[21] Appl. No.: 381,681

[22] Filed: May 25, 1982

Related U.S. Application Data

[63] Continuation-in-part of Ser. No. 100,504, Dec. 5, 1979, Pat. No. 4,332,514.

[51] Int. Cl.³ ............................................. B23B 47/28
[52] U.S. Cl. .................................. 408/103; 408/115 R
[58] Field of Search ............... 408/103, 104, 107, 109, 408/110, 111, 115 R, 115 B

[56] References Cited

U.S. PATENT DOCUMENTS

| | | | |
|---|---|---|---|
| 1,153,841 | 9/1915 | Earle | 408/115 |
| 1,207,717 | 12/1916 | Dartt | 408/109 |
| 2,260,784 | 10/1941 | Morton | 408/103 |
| 2,651,951 | 9/1953 | Altenburger | 408/115 X |
| 2,724,298 | 11/1955 | Olson | 408/115 X |
| 2,903,920 | 9/1959 | Blecha | 408/115 |
| 3,464,296 | 9/1969 | Harper | 408/115 R |
| 3,557,641 | 1/1971 | Schwandt | 408/115 |
| 3,864,053 | 2/1975 | Harwood | 408/110 |
| 4,093,394 | 6/1978 | Adams | 408/103 |
| 4,158,523 | 6/1979 | Schotzko | 408/115 R |
| 4,332,514 | 6/1982 | Dergo | 408/103 |

OTHER PUBLICATIONS

"P S Guide: The Fine Art of Dowel Joinery", Thomas H. Jones, *Popular Science*, 1979.

*Primary Examiner*—Z. R. Bilinsky
*Attorney, Agent, or Firm*—Harness, Dickey & Pierce

[57] ABSTRACT

Disclosed in an all-angle dowel drill fixture having a drill guide block and a clamping assembly pivotally mounted on a base plate. The drill guide block can be selectively positioned and pivoted to provide a drill guide for drilling matching dowel holes in the ends of workpieces for end to end dowelling or selectively positioned to provide a drill guide for drilling matching dowel holes in the sides of workpieces for edge to edge dowelling.

12 Claims, 7 Drawing Figures

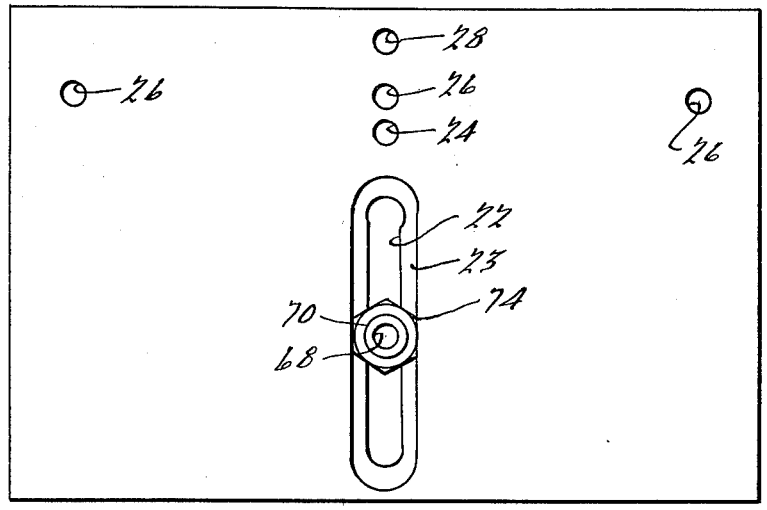
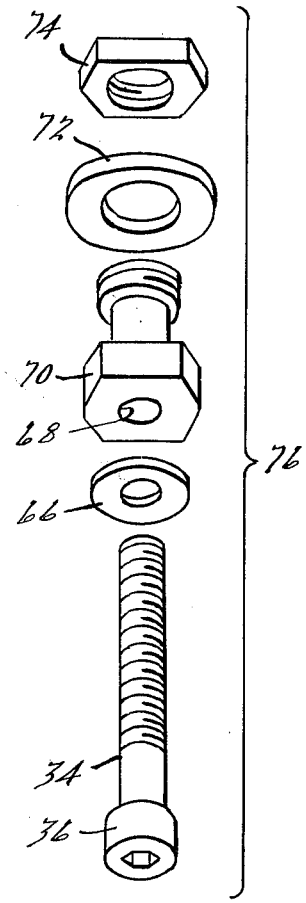
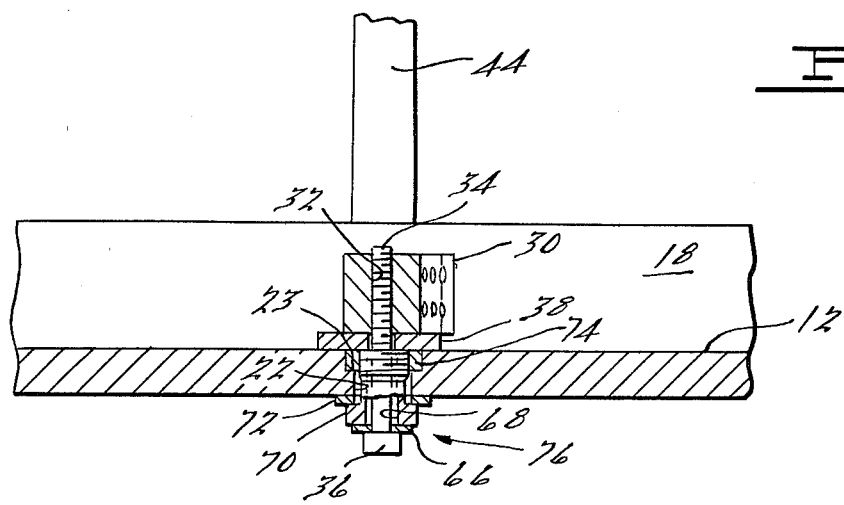

DOWEL DRILL FIXTURE

BACKGROUND OF THE INVENTION

This application is a continuation-in-part of my copending application, Ser. No. 100,504, filed Dec. 5, 1979 now U.S. Pat. No. 4,332,514.

The present invention relates generally to an adjustable dowel jig fixture which is easily adapted to provide drill guide means for application to various kinds of workpieces to enable accurate dowel hole drilling therein for end to end or edge to edge dowelling. The dowel drill fixture of the present invention can be adjusted to all angles and can be adapted for accurately drilling matching blind mirror image dowel holes into workpieces for all angles of end to end dowelling.

In the construction of various objects from wood, such as furniture and the like, it is often desirable or necessary for a craftsman to attach two separate pieces of wood together in a strong and accurately aligned manner. Such attachment is commonly accomplished by dowelling adjacent edges or ends of the two pieces together. In dowelling the two pieces of wood together, matching holes are bored into each of the adjacent portions of the two pieces and a dowel is inserted into the hole in one piece and then inserted into the matching and aligned hole in the other piece, using glue to secure the dowel and adjacent portions of the workpieces together. Usually, of course, a plurality of matching holes and dowels are employed. It is often important that the wood or workpieces be accurately positioned with respect to each other, which result can be obtained only if the dowel holes are accurately drilled to provide matching and aligned holes so that when dowels are inserted therein the workpieces will have the desired alignment.

Various kinds of dowel drill fixtures are known in the art. For example, various dowel drill fixtures are shown in U.S. Pat. Nos. 1,153,841; 1,207,717; 2,260,784; 2,651,951; 2,903,920; 3,464,296; 3,557,641; 3,864,053; 4,093,394; and 4,158,523. There remains, however, a need for an accurate dowel drill guide fixture which is adaptable to provide a plurality of different angles and heights for end to end dowelling and which also is adaptable to provide a plurality of heights and positions for edge to edge dowelling. It would also be desirable, of course, if such a dowel drill fixture could be economically manufactured so as to be practically available to the average craftsman.

Accordingly, it is an object of the present invention to provide a dowel fixture which provides precise guide means for various dowelling set ups and which is easily manipulated and adjusted by the craftsman from one selected position to another. Another object of the present invention is to provide a dowel drill fixture which provides single center line or double center line positioning with only one set up and which can be handheld in use. A further object of the present invention is to provide a dowel drill fixture which is adaptable for both edge to edge dowelling and all angles of end to end dowelling. Yet another object of the present invention is to provide a dowel drill fixture which can be economically manufactured. These and other objects, features and advantages of the present invention will become apparent from the following disclosure taken in conjunction with the accompanying drawings and appended claims.

BRIEF DESCRIPTION OF THE DRAWINGS

FIG. 5 is a plan view of the base plate of the dowel drill fixture shown in FIG. 1, with the drill guide block, backrail and clamping assembly removed;

FIG. 6 is a cross-sectional view taken along line 6—6 of FIG. 1; and

FIG. 7 is an exploded view of the fastening assembly for the drill guide block.

DESCRIPTION OF THE INVENTION

Figure 1:
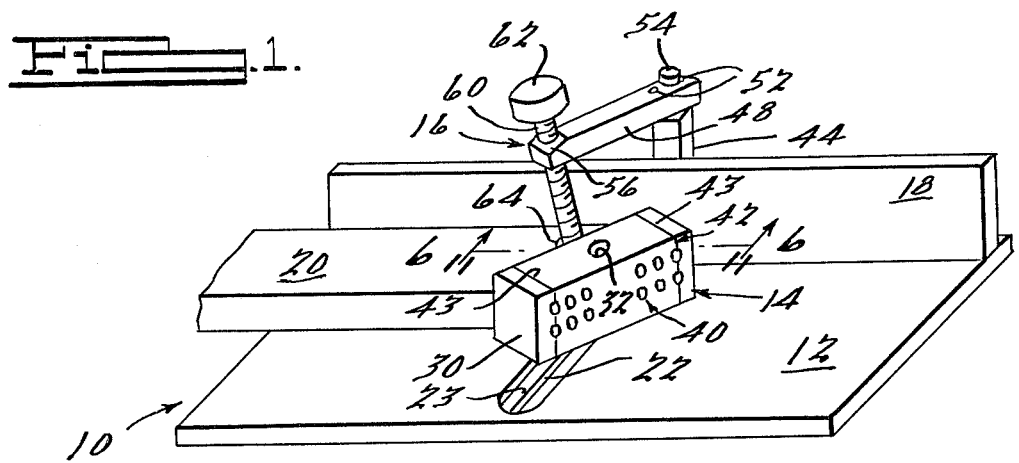
FIG. 1 is a perspective view of a dowel drill fixture of the present invention with backrail installed and in operative association with a board to be dowelled.
Figure 2:
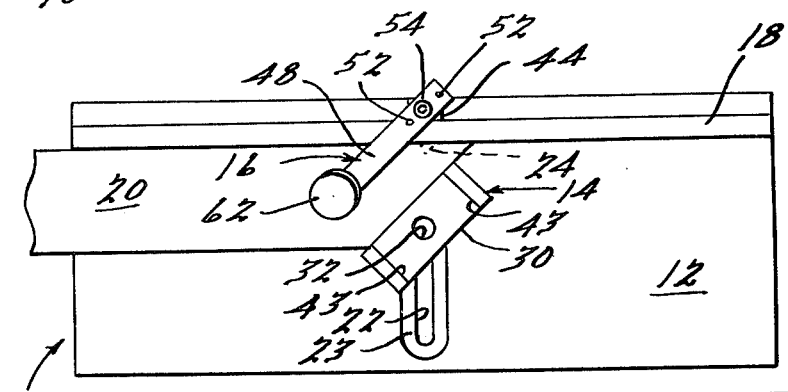
FIG. 2 is a plan view of the dowel drill fixture and board of FIG. 1.
Figure 3:
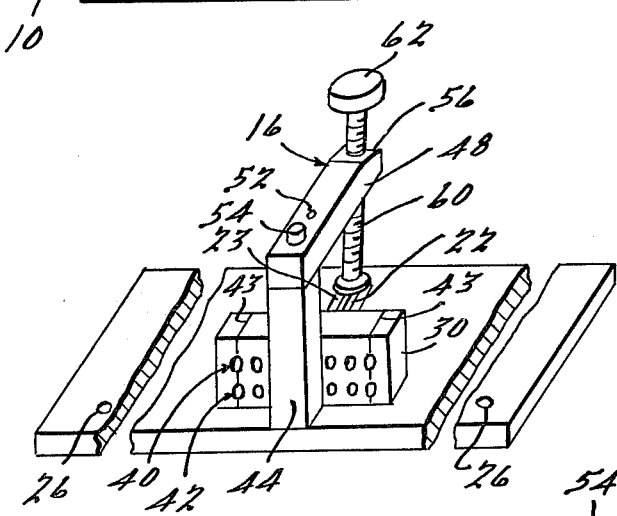
FIG. 3 is a perspective view of a dowel drill fixture of the present invention with backrail removed for drilling edge to edge dowel holes.
Figure 4:
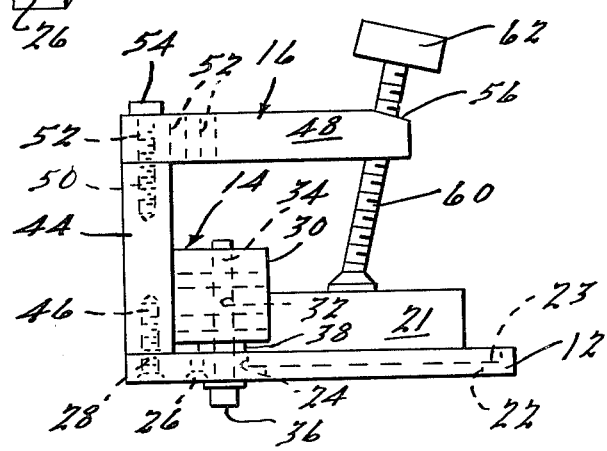
FIG. 4 is an end elevational view of the dowel drill fixture of FIG. 3 in operative association with a board to be dowelled.

Now referring to the Figures, an all-angle dowel drill fixture is shown and indicated generally by the numeral 10. Dowel drill fixture 10 generally comprises base plate 12 with drill guide block assembly 14, clamping assembly 16 and backrail 18 mounted thereon. FIGS. 1 and 2 show fixture 10 in a configuration suitable for drilling dowel holes in the end of a board, or workpiece. It will be appreciated, however, that backrail 18 is removably mounted on base plate 12 and FIGS. 3 and 4 show fixture 10 with backrail 18 removed, and in a configuration suitable for drilling dowel holes in the lateral edge of a board for edge to edge dowelling. As will be further appreciated from the following description of the present invention, dowel drill fixture 10 is easily adapted or positioned as shown in FIGS. 1 and 2 to drill mirror image dowel holes into end portions of workpieces for end to end dowelling or positioned as shown in FIGS. 3 and 4 to drill dowel holes into the lateral edge portions of workpieces for edge to edge dowelling. A further understanding of the present invention will be obtained from the following description of each of the structural elements thereof.

Base plate 12 is a rectangular base adapted to support drill guide block assembly 14, clamping assembly 16, removable backrail 18 and a workpiece, shown in FIGS. 1 and 2 as board 20 and in FIG. 4 as board 21. Base plate 12 can be table mounted or handheld and is preferably fabricated from aluminum, steel, or other metal. Of course, base plate 12 can be fabricated from wood, plastic or other material suitable for the conditions of intended use.

As best shown in FIGS. 2, 5 and 6, base plate 12 includes a slot 22 surrounded by a recess 23 both of which are adapted to cooperate with fastening means for selective attachment of drill guide block assembly 14. Slot 22 extends through the entire thickness of base plate 12 and lies along an imaginary line extending forwardly from the position of backrail 18, as best shown in FIGS. 2 and 5. As used herein, the term "forward" is intended to refer to the right direction as viewed in FIG. 4, or the downward direction as viewed in FIGS. 2 and 5. Slot 22 and recess 23 are adapted for selectively mounting drill guide block assembly 14 at any preselected distance from backrail 18 for drilling dowel holes in the end of a workpiece for end to end dowelling. The exact length of slot 22 is not critical so long as the number is sufficient to provide the desired flexibility of use of dowel drill fixture 10. Base plate 12 also has a threaded hole 24 which is located on the same imaginary line as is slot 22 but is positioned rearwardly therefrom. Threaded hole 24 is adapted for mounting drill guide block assembly 14 in position against vertical clamp post 44 of clamping assembly 16 for drilling dowel holes in the edge of a workpiece for edge to edge dowelling.

As best shown in FIGS. 5 through 7, the fastening assembly 76 for attaching drill guide block 14 to base plate 12 includes adjustment lock bolt 70 which extends through washer 72 and slot 22 to threadably engage slide lock jam nut 74. Jam nut 74 is preferably a hex nut which is received within recess 23 with its upper face substantially flush with the upper surface of base plate 12. The sides of recess 23 rotationally restrain jam nut 74 to facilitate the convenient tightening or loosening of lock bolt 70 in order to adjust the position of lock bolt 70 in slot 22. Lock bolt 70 includes a smooth bore 68 extending axially therethrough for pivotally receiving pivot bolt 34 therein, as is explained in detail below.

As shown in FIGS. 3, 4 and 5, base plate 12 has a plurality of smooth bores 26 adapted to receive fastening means for removably mounting backrail 18 on base plate 12. It is contemplated that each bore 26 will receive a screw or the like which will extend into the lower portion of backrail 18 to secure it to base plate 12 in a conventional manner. Base plate 12 further has a smooth bore 28 which is adapted to receive fastening means such as screw 46, as shown in FIG. 4, for mounting vertical clamp post 44 of clamping assembly 16 on base plate 12.

Drill guide block assembly 14 comprises drill guide block 30, vertical pivot bolt 34 which extends through slot 22 for pivotally attaching drill guide block 30 to base plate 12, and optionally, spacers 38 which provide means for adjusting the height of drill guide block 30 with respect to base plate 12.

Drill guide block 30 has a plurality of drill guide bores 40 and 42 extending horizontally therethrough and a centrally disposed threaded bore 32 extending vertically therethrough for threadably receiving pivot bolt 34. As shown in the figures, drill guide bores 40 and 42 can comprise a lower row of bores 40 and an upper row of bores 42 extending in a parallel manner.

Each guide bore of bores 40 and 42 is intended to provide means for locating and guiding a drill bit with respect to a workpiece and as will be readily appreciated by the skilled artisan, provision of lower guide bores 40 in a lower horizontal plane and upper guide bores 42 in a higher horizontal plane provides two heights for drilling dowel holes for one height of drill guide block 30. Additional height adjustment can be provided by one or more spacers 38 which have a washer-like shape and are of selected thickness. Spacers 38 can be placed between base plate 12 and drill guide block 30 to adjust the height of drill guide block 30 relative to base plate 12. Spacers 38 are, of course, optional as drill guide block 30 can be placed directly onto base plate 12.

A plurality of each of lower drill guide bores 40 and upper drill guide bores 42 are provided in pairs of bores, each one of each pair being located an equal distance from the pivotal axis of guide block 30 or vertical smooth bore 32. Thus, guide block 30 can be pivoted to provide symmetrical guide bores or more than one dowel hole can be drilled in the same horizontal plane without repositioning drill guide block 30 on base plate 12. Alignment means such as lines 43 are provided on drill guide block 30 to facilitate visual alignment thereof for edge to edge dowelling as disclosed in more detail hereinafter. While the twelve bore configuration shown in the Figures is preferred for use in the present invention, other configurations of drill guide bores are, of course, contemplated to be within the broad scope of the present invention.

As mentioned above, drill guide block 30 also has a centrally disposed, threaded bore 32 extending vertically therethrough. Bore 32 is adapted to receive threaded pivot bolt 34 which is slidably received in slot 22 or fixedly received in 24 in base plate 12 to secure drill guide block 30 to base plate 12. Pivot bolt 34 has a caphead 36 to facilitate rotation thereof by the craftsman for adjusting the pivotal position of drill guide block 30, and it is contemplated that pivot bolt 34 will extend through any spacers 38 used to adjust the height of drill guide block 30.

Each drill guide bore of lower guide bores 40 and upper guide bores 42 is intended to provide guide means for a drill bit and, hence, should have walls of sufficient hardness to resist wearing due to rotation of a drill inserted therein. Thus, drill guide block 30 should be made of a hardened steel such as a tool steel or, alternatively, the drill guide bores should be provided with hard bushings to provide walls of a suitably hard material.

Of course, the inner diameter of each drill guide bore must be suitably sized so as to provide guide means for the desired size drill bit without allowing sufficient play or deviation from the axis of the bore by the drill bit to adversely effect the desired accuracy of the guide means. Thus, it is contemplated that alternative drill guide blocks 30 having different size drill guide bores will be available for use in drill fixture 10.

Clamping assembly 16 is preferably made of aluminum, steel or other metal or suitably strong material and generally comprises clamp post 44, horizontal arm 48 and clamp rod 60. Clamp post 44 extends vertically upwardly from base plate 12 and is mounted thereon by means of threaded fastener 46, which can be a screw or the like, which extends upwardly through smooth bore 28 in base plate 12 and is threadably received in the lower portion of clamp post 44. Horizontal arm 48 extends horizontally over base plate 12 and is attached to the upper end of clamp post 44 by threaded bolt 50. Threaded bolt 50 extends through one of a plurality of smooth vertical bores 52 in the rearward end portion of horizontal arm 48 and to threadably engage the top portion of clamp post 44. Bolt 50 has a caphead 54 to facilitate rotation thereof by the craftsman. Thus, horizontal arm 48 can be easily positioned on clamp post 44 by inserting bolt 50 through the desired one of the plurality of bores 52 and pivoting horizontal arm 48 to the desired position. The forward end of horizontal arm 48 has a chamfered end 56 through which extends a threaded bore canted from the vertical and adapted to threadably receive the shank of clamp rod 60. Clamp rod 60 has an enlarged end 62 for easy manipulation by the craftsman and a pivotally assembled clamp end 64 adapted to clamp a board or workpiece against base plate 12, for example, a board such as 20 as shown in FIGS. 1 and 2 or board 21 as shown in FIG. 4.

Backrail 18 is generally in the shape of an upstanding rectangular wall and is removably mounted on base plate 12. Backrail 18 is preferably made of aluminum, steel or other suitably strong material and is removably mounted proximate to and parallel to the rearward edge of base plate 12. Backrail 18 serves as a back guide rail for a workpiece such as board 20 when drill guide fixture 10 is employed for drilling dowel holes in the end portions of workpieces and is removed when dowel drill fixture 10 is used for drilling edge to edge dowel holes. Backrail 18 has a height less than clamp post 44 so that horizontal arm 48 of clamp post 44 can extend horizontally over backrail 18 to support clamp rod 60. Backrail 18 is attached to base plate 12 by a plurality of fasteners such as screws (not shown in the figures) which extend through smooth bores 26 in base plate 12 upwardly into the bottom portion of backrail 18.

Still further understanding of the present invention will be obtained from the following description of the operation of dowel drill fixture 10. Thus, for drilling blind mirror image dowel holes into the end of a board, the board is positioned, for example, as shown in FIGS. 1 and 2 for board 20 on the leftward portion of base plate 12 with one lateral edge and the right end of board 20 in abutting relationships respectively to backrail 18 and drill guide block 30. Board 20 is shown as having an angled end which illustrates use of dowel drill fixture 10 as an all-angle drill fixture for drilling blind mirror image dowel holes in the ends of workpieces. In placing board 20 into position, pivot bolt 34 and lock bolt 72 are loosened and slidably positioned at a distance from backrail 18 which will provide a suitable location for drill guide block 30 to locate drill guide bores 40 or 42 with respect to the end of board 20. Once such suitable location is obtained, lock bolt 72 is tightened with respect to jam nut 74 in order to fix the position of lock bolt 72 in slot 22. So long as pivot bolt 34 is not tightened with respect to threaded bore 32, drill guide block 30 may be pivoted horizontally relative to such fixed position.

Board 20 is firmly placed against backrail 18 and drill guide block 30 which may be pivoted so that the rearward face is flush against the end of board 20 regardless of the angle of cut thereof. Then horizontal arm 48 is positioned over board 20 and secured by means of bolt 50, clamp rod 60 is rotated so as to move downwardly to securely clamp board 20 against base plate 12, and bolt 34 is tightened to secure drill guide block 30 and fix its pivotal position relative to base plate 12.

It should be noted that horizontal arm 48 is selectively positioned with respect to clamp post 44 and board 20 by selecting the desired smooth bore 52 for bolt 50 and pivoting horizontal member 48 to the desired position over board 20 whether to the left, as shown in the drawings, or to the right of clamp post 44. In addition, it should be noted that clamp rod 60 extends through horizontal arm 48 at an angle from the vertical so that the lower portion of clamp rod 60 is closer to backrail 18 than is the upper portion thereof. Thus, the clamping force exerted by clamp rod end 64 is directed toward base plate 12, but also towards backrail 18 and drill guide block 30. The resulting force urges and holds board 20 into the aforementioned abutting relationship against base plate 12, backrail 18 and drill guide block 30 for accurate dowel hole drilling.

As taught hereinbefore, the height of drill guide block 30 can be easily adjusted by means of one or more spacers 38 placed between drill guide block 30 and base plate 12. Of course, it is contemplated that the exact number of spacers, if any, and the thickness thereof can be used to obtain a variety of elevations and it is further contemplated that spacers of various thicknesses will be provided for use with drill fixture 10 to facilitate accurate and exact height adjustment of drill guide block 30 with respect to base plate 12 and the workpiece.

The craftsman can now drill a dowel hole into board 20 with a drill extending through one of the lower drill guide bores 40 or upper drill guide bores 42. If desired, more than one hole can be drilled. Then board 20 is removed from dowel drill fixture 10 and a second board with a matching end is placed on the right side of base plate 12. Drill guide block 30 is pivoted against the end of the second board which is handled in a manner analogous but symmetrical to that disclosed above for board 20. Matching dowel holes are drilled through the drill guide bores 40 or 42 symmetrical with those employed for board 20. Thus, drill guide block 30 can be positioned for drilling an end of a first workpiece end then pivoted about a stationary axis relative to slot 22 provided by bolt 34 for drilling matching dowel holes in an end of a second, matching workpiece. Accurate, mirror image matching dowel holes are obtained since the pivotal axis of drill guide block 30 remains fixed by virtue of the fixed position of pivot bolt 34 in slot 22 which is maintained by lock bolt 70 and jam nut 74. It will, of course, be understood that the above procedure may be reversed to drill dowel holes first in a workpiece on the right side of dowel drill fixture 10 and then on the left.

As previously disclosed, dowel drill fixture 10 can also be configured and used for edge to edge dowel hole drilling. For edge to edge dowel hole drilling, fixture 10 of the present invention is configured as generally shown in FIGS. 3 and 4 wherein backrail 18 is removed and drill guide block 30 is positioned against clamp post 44 by inserting bolt 34 into threaded hole 24, with or without one or more height adjusting spacers 38. The forward facing surface of clamp post 44 is in abutting relationship to the rearward facing surface of drill guide block 30 so that rotational movement of drill guide block 30 about the axis of bolt 34 is precluded. Then a board 21 is positioned as shown in FIG. 4, with a lateral edge against the forward face of drill guide block 30. It will, of course, be appreciated, that board 21 can be selectively positioned against drill guide block 30 to drill a plurality of dowel holes in the side thereof. For this purpose, marks 43 are provided on the top surface of drill guide block 30 to provide visual alignment means for aligning one or more of drill guide bores 40 or 42 with a measured mark on board 21 provided by the craftsman for each dowel hole or set of dowel holes to be drilled.

Clamp rod 60 is employed to selectively clamp board 21 to base plate 12 and in position against the forward face of drill guide block 30. It will be appreciated that for edge to edge dowelling, horizontal arm 48 preferably extends at a right angle to the forward face of drill guide block 30 so that the application of clamping force to workpiece 21 results in a clamping force directed in a plane normal to the forward face of drill guide block 30.

It will be appreciated that the specific form of the present invention disclosed above is well calculated to achieve the objects of the present invention. It will also be appreciated that while a specific form of the present invention has been disclosed and described herein, it is to be understood that the present invention may be varied within the scope of the appended claims without departing from the spirit thereof.

What is claimed is:

1. A drill fixture comprising:
a base plate having a slot therein;
a drill guide block having at least one first pair of bores adapted to guidingly receive a drill bit therein and a second bore adapted to receive a pivot means therein;
pivot means located in said second bore and slidably received in said slot for pivotally attaching said drill guide block to said base plate; said pivot means including slide locking means for selectively fixing the position of said pivot means in said slot without interfering with the pivoting of said drill guide block; and pivot locking means for selectively fixing the pivotal position of said drill guide block.

2. A drill fixture as recited in claim 1, wherein said second bore is a threaded bore, and said pivot means comprises a lock bolt slidably received in said slot, said lock bolt having a bore extending axially therethrough, a jam nut threadably engaging said lock bolt, and a pivot bolt pivotally received in said bore and threadably engaging said threaded bore in drill guide block, said lock bolt and said jam nut being adapted to be selectively tightened to fix said pivot means at a preselected position in said slot independent of the pivotal position of said drill guide block, and said pivot bolt being adapted to be selectively tightened in said threadable engagement with said drill guide block to fix the pivotal position of said drill guide block.

3. A drill fixture as recited in claim 2, wherein said base plate has a recess surrounding said slot, said recess being adapted to receive and rotationally restrain said jam nut therein.

4. A drill fixture as recited in claim 3, wherein said jam nut is received in said recess in a substantially flush relationship with said base plate.

5. A drill fixture as recited in claim 4, wherein said threaded bore in said drill guide block lies generally along a vertical axis of said drill guide block and said drill guide block has at least one pair of parallel horizontal bores, each of said horizontal being an equal distance from said vertical threaded bore.

6. A drill fixture as recited in claim 5, further comprising clamping means for securing a workpiece relative to said drill guide block including a vertical post attached to, and extended upwardly from, said base plate, a horizontal member selectively pivotally attached to said vertical post and having an end portion spaced from said vertical post and with a threaded bore therein, said threaded bore extending generally downwardly and being canted toward said vertical post, and a rod threadably disposed in said threaded bore and having engaging means on the lower end thereof for engaging a workpiece and means on the upper end thereof for selectively rotating said rod to thereby move said engaging means toward and away from said workpiece.

7. A drill fixture as recited in claim 6, wherein a spacer is disposed between said drill guide block and said base plate and said pivot bolt extends through said spacer.

8. A drill fixture as recited in claim 7, further comprising a backrail removably attached to said base plate.

9. A drill fixture as recited in claim 8, wherein said drill guide block has a plurality of horizontal bores the axes of which are in more than one horizontal plane.

10. A drill fixture comprising:
a base plate having a slot therein, said slot being surrounded by a recessed portion of said base plate;
a drill guide block having at lease one pair of horizontal bores adapted to guidingly receive a drill bit therethrough and a threaded bore extending therethrough generally along the vertical axis thereof, each one of said pair of horizontal bores being parallel to the other of said pair and spaced an equal distance from said vertical threaded bore as the other of said pair;
clamping means for securing a workpiece against said base plate and relative to said drill guide block, said clamping means comprising a vertical post attached to, and extending upwardly from, said base plate, a horizontal member selectively pivotally attached to said vertical post and having an end portion spaced from said vertical post and with a threaded bore therein, said threaded bore extending generally downwardly canted toward said vertical post, and a rod threadably disposed in said threaded bore and having engaging means on the lower end thereof for engaging a workpiece and means on the upper end thereof for selectively rotating said rod to thereby move said engaging means toward and away from said workpiece;
a generally rectangular backrail having an edge portion removably attached to said base plate and adapted to cooperate with said clamping means to secure a workpiece relative to said drill guide block; and
pivot means slidably received in said slot for selectively pivoting said drill guide block relative to said base plate, said pivot means including a lock bolt extending through said slot from a first side of said base plate, a jam nut on a second opposite side of said base plate, said jam nut threadably engaging said lock bolt and being received within said recessed portion in a flush relationship with said second side of said base plate, said lock bolt having an axially-extending bore therethrough, a pivot bolt being pivotally received in said axially-extending bore and extending therethrough from said first side of said base plate, said pivot bolt threadably engaging said threaded bore in in said drill guide block so that said drill guide block is pivotally attached to said base plate, said lock bolt and said jam nut being adapted to be selectively tightened to fix said pivot means at a preselected position in said slot independent of the pivotal position of said drill guide block, and said pivot bolt being adapted to be selectively tightened in said threadable engagement with said drill guide block to fix the pivotal position of said drill guide block.

11. A drill fixture as recited in claim 10, wherein at least one spacer is disposed between said drill guide block and said base plate and said pivot bolt extends through said spacer.

12. A drill fixture as recited in claim 11, wherein said drill guide block has a plurality of horizontal bores, the axes of which are in more than one horizontal plane.

* * * * *

UNITED STATES PATENT AND TRADEMARK OFFICE
CERTIFICATE OF CORRECTION

PATENT NO. : 4,449,867

DATED : May 22, 1984

INVENTOR(S) : Stephen J. Dergo

It is certified that error appears in the above-identified patent and that said Letters Patent is hereby corrected as shown below:

Claim 10, line 7, delete "lease" and substitute therefor --least--.
Claim 10, line 48, delete "in", second occurrence.

Signed and Sealed this

Thirtieth Day of October 1984

[SEAL]

Attest:

GERALD J. MOSSINGHOFF

Attesting Officer    Commissioner of Patents and Trademarks